(12) United States Patent
Öhman

(10) Patent No.: US 11,156,088 B2
(45) Date of Patent: Oct. 26, 2021

(54) GAS EXPANSION DEVICE AND METHOD FOR EXPANDING GAS

(71) Applicant: ATLAS COPCO AIRPOWER, NAAMLOZE VENNOOTSCHAP, Wilrijk (BE)

(72) Inventor: Henrik Öhman, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 632 days.

(21) Appl. No.: 16/077,096

(22) PCT Filed: Feb. 13, 2017

(86) PCT No.: PCT/BE2017/000011
§ 371 (c)(1),
(2) Date: Aug. 10, 2018

(87) PCT Pub. No.: WO2017/143408
PCT Pub. Date: Aug. 31, 2017

(65) Prior Publication Data
US 2021/0207482 A1    Jul. 8, 2021

Related U.S. Application Data

(60) Provisional application No. 62/298,682, filed on Feb. 23, 2016.

(30) Foreign Application Priority Data

Jan. 9, 2017   (BE) .................................. 2017/5006

(51) Int. Cl.
*F01C 1/08* (2006.01)
*F01C 21/00* (2006.01)
(Continued)

(52) U.S. Cl.
CPC .................. *F01C 1/08* (2013.01); *F01C 1/00* (2013.01); *F01C 21/002* (2013.01); *F04C 18/16* (2013.01); *F04C 29/0014* (2013.01)

(58) Field of Classification Search
None
See application file for complete search history.

(56) References Cited

U.S. PATENT DOCUMENTS 3,423,017 A    1/1969  Schibbye
4,068,829 A *  1/1978  Laurent ................... B29B 7/805
                                                    366/159.1
(Continued)

FOREIGN PATENT DOCUMENTS

CN       204060830 U     12/2014
DE    102006006129 A1 *   8/2007
(Continued)

OTHER PUBLICATIONS

Machine Translation of DE 102006006129 A1 (Feb. 10, 2006), Piatkowski; IP.com.*
(Continued)

*Primary Examiner* — Charles G Freay
(74) *Attorney, Agent, or Firm* — Bacon & Thomas, PLLC

(57) ABSTRACT

Gas expansion device for expanding a gas or a gas-liquid mixture, where the gas expansion device includes a gas expansion element with an inlet port for the gas to be expanded and an inlet pipe for the gas to be expanded. The inlet pipe is connected to the inlet port where the gas expansion device includes a first liquid injection point for the injection of liquid, where the first liquid injection point is at a position level with the inlet port or upstream from the inlet port.

13 Claims, 1 Drawing Sheet

(51) Int. Cl.
F04C 29/00 (2006.01)
F04C 18/16 (2006.01)
F01C 1/00 (2006.01)

(56) References Cited

U.S. PATENT DOCUMENTS

| | | | | |
|---|---|---|---|---|
| 8,556,606 | B2* | 10/2013 | Noguchi | F01C 21/002 |
| | | | | 418/98 |
| 8,870,166 | B2* | 10/2014 | Shepherd | B01D 53/185 |
| | | | | 261/78.2 |
| 10,415,706 | B2* | 9/2019 | Juchymenko | F16H 57/0404 |
| 2009/0188253 | A1* | 7/2009 | Smith | F01C 21/04 |
| | | | | 60/657 |
| 2010/0034684 | A1 | 2/2010 | Ast et al. | |
| 2013/0058822 | A1* | 3/2013 | Feller | F04C 29/028 |
| | | | | 418/84 |

FOREIGN PATENT DOCUMENTS

EP  2581552 A1  4/2013
JP  63202701 U  12/1988

OTHER PUBLICATIONS

International Search Report in related PCT Application No. PCT/BE2017/000011, dated Aug. 28, 2017.
Written Opinion in related PCT Application No. PCT/BE2017/000011, dated Aug. 28, 2017.

* cited by examiner

GAS EXPANSION DEVICE AND METHOD FOR EXPANDING GAS

The present invention relates to a gas expansion device and method for expanding gas.

BACKGROUND OF THE INVENTION

Applications for multiphase fluid expansion in a volumetric expansion element that is coupled to a generator for electrical energy present a wide range of characteristics and limitations.

One example can be found in CN 204,060,830 wherein a compressed air energy storage system can be found. The system comprising a compressor, an expansion machine, an oil reservoir, a high-pressure air storage tank and an oil sprayer.

In some known applications, the pressure and gas compositions are relatively stable over time, which enables constant operating characteristics and a low control level.

In other applications the operating conditions can vary substantially, which leads to inefficiency and/or reliability problems.

Some applications, such as pressure reduction stations for natural gas, generally maintain a constant pressure downstream from the pressure reduction stations but a variable pressure upstream. The constant pressure downstream is needed for the correct distribution of gas to the end customers while the varying pressure upstream is determined by effects such as variations in the supply and an unstable control.

In such cases the energy generated by the expansion device is strongly influenced by the inlet pressure. There are two reasons for this. Firstly a higher inlet pressure leads to an increased pressure ratio and consequently a greater enthalpy drop per unit of expanded mass, secondly a higher inlet pressure leads to a greater mass flow on account of a higher gas density.

As it is of vital importance for the system that the downstream pressure is maintained, the expansion machine may only expand a mass flow that is equivalent to the instantaneous demand for gas at the endpoints of the gas network.

This leads to requirements for a complex variability of the volume flow at the inlet in a volumetric expansion machine with variable inlet pressure.

Existing solutions to control the volume flow in a volumetric expansion device include VSD, i.e. variable speed drives, flow reduction at the inlet, and mechanical means to vary the stroke volume of the machine.

Flow reduction at the inlet means that the density of the gas can be adjusted to control the mass flow that is expanded. The disadvantage is the clear efficiency loss as the pressure ratio of the expansion device is substantially reduced at all times, except when a maximum flow is required which is rarely the case.

To control the stroke volume, a movable sleeve valve or other valve mechanism that changes the stroke volume of the machine is generally used. Such solutions can be extremely efficient but are expensive and increase the complexity of the design and thereby jeopardise the reliability.

A VSD enables a precise control of the expanded mass volume and also preserves a high efficiency and low design complexity. But the torque of volumetric expansion machines is generally little dependent on the speed or even inversely dependent.

This means that a VSD generator must be able to operate safely at a low speed and at a high torque. Moreover, it means that forces that act on the inside of the volumetric expansion device will be defined by the inlet pressure, and not by the generated power. In other words the forces are directly dependent on the mechanical torque that is produced on the outgoing shaft.

In VSD applications, the risk of a structural overload of the expansion device is clear if the inlet pressure varies upwards. If an overdimensioned expansion machine is used, the efficiency will suffer at every inlet pressure in normal operating conditions. If a precisely dimensioned expansion device is used, the efficiency will be optimised at a normal inlet pressure, while structural damage can be expected at high peaks in the inlet pressure.

Moreover, it is complex and expensive to control the speed in conditions with an exceptionally high torque and a low speed.

A related problem is the expensive and complex moderations of the problem of too high a speed. When the braking torque is lost, the expansion machine will accelerate quickly and create hazardous operating conditions that jeopardise the reliability of the system and will result in an excessive supply to the downstream gas network.

An often used moderation technique is to use quick-closing valves before the expansion device, such that the mass flow and the torque are effectively cut off in a fraction of a second.

Such quick-closing valves cause a temporary vacuum at the inlet of the expansion device on account of its rotation delay. The vacuum quickly brakes the expansion machine to a stop. The use of quick-closing valves means very high transient loads on the mechanical system.

Moreover, the expansion machine remains out of operation until it is properly controlled, restarts and is synchronised again with the electricity network.

The loss of braking torque can be due to a broken shaft connection, then a stoppage by a quick-closing valve can be adequate. But it can also be due to short or long disruptions in the electricity network, an unstable speed control of the VSD, or an overload of the brake generator.

The detection of real or supposed emergency situations, for example in auxiliary systems or by means of an emergency button, can lead to the need to use quick-closing valves.

A safe, reliable and quick way to limit the torque in an expansion device is thus desirable, and preferably a method that can operate continuously without losing operating time of the expansion machine, even if an inlet pressure is temporarily stopped.

SUMMARY OF THE INVENTION

The purpose of the present invention is to provide a solution to the aforementioned and other disadvantages by providing a gas expansion device for expanding a gas or a gas-liquid mixture, whereby the gas expansion device comprises a gas expansion element with an inlet port for the gas to be expanded and an inlet pipe for the gas to be expanded, whereby the inlet pipe is connected to the inlet port, whereby the gas expansion device comprises a first liquid injection point for the injection of liquid, whereby the first liquid injection point is at a position level with the inlet port or upstream from the inlet port, and preferably upstream from the inlet port and whereby the expansion device is provided with a liquid separator for separating liquid from gas that is expanded in the gas expansion element, whereby the first liquid injection point is connected to a liquid outlet of the liquid separator.

As a result, when too high a torque is detected, liquid can be injected in the gas flow upstream from the inlet port, or level with the inlet port, so that this liquid goes into an expansion chamber together with the gas.

When operating at high speed, the liquid that is injected ensures a braking effect on the inlet gas. The energy needed to accelerate the liquid reduces the total pressure of the gas, such that the pressure ratio of the expansion and volumetric inflow of the gas expansion device is reduced. As a result the torque is limited.

When operating at low speed the liquid that is injected fills a large proportion of the chamber volume that would otherwise be occupied by inlet gas. Consequently the volumetric inflow of gas is reduced. The pressure ratio remains preserved but the mass flow is reduced. As a result the torque is limited.

Furthermore, when an emergency situation is detected that requires a rapid stoppage of the gas expansion device, liquid can be injected upstream from the inlet port.

The liquid then has the effect as described above, but also substantially reduces the high speed that would otherwise briefly occur. This means that a protection valve, before the expansion device, can be closed with a slower operating speed than would otherwise be the case. Consequently an extremely fast and expensive quick-closing valve is unnecessary, and a standard valve can be used for this, a possible brief overload does not occur and the gas expansion device is operational again more quickly after an emergency situation.

Such an emergency situation can occur in the event of a technical fault, for example a disconnection of the energy network to which energy is supplied, or the loss of the mechanical coupling between the expansion element and the generator, and can be detected in many ways known to a man skilled in the art.

Such an emergency situation can also occur if an auxiliary apparatus, correctly or incorrectly, issues an emergency signal, or if an emergency stop procedure is activated by human intervention or by software.

Furthermore, because the gas expansion device comprises a liquid separator, the same liquid that has already been separated from the gas, normally oil, can be used to supply the first liquid injection point.

In a preferred embodiment, the gas expansion device is provided with means for starting up or switching off a flow of the said liquid to the first liquid injection point, so that the first liquid injection point can be used or otherwise according to need.

Preferably these means are connected to a control unit to control the means, and the gas expansion element is mechanically coupled to a generator such that the expansion element can drive the generator, whereby the control unit is connected to the generator.

As a result operating conditions and measured parameters of the generator can be used to control the said means.

Preferably the gas expansion device comprises a second liquid injection point that is configured to inject the said liquid in the gas expansion element at a position downstream from the inlet port, and the gas expansion device is provided with a reservoir or supply pipe for the said liquid, whereby the first liquid injection point and the second liquid injection point are both connected to this supply pipe or this reservoir.

As a result the same liquid that is normally already injected via the second liquid injection point for cooling and/or lubrication can also [be injected] to the first liquid injection point so that the complexity of the device is reduced.

Preferably the said means comprise a three-way valve with three connecting ports, whereby a first of the connecting ports is connected to the supply pipe or the reservoir and the other connecting ports are each connected to one of the said liquid injection points.

As a result, the supply of the second liquid injection point, that is desirable in normal operation, can easily be diverted to the first liquid injection point if the operation is such that the use of the first liquid injection point is desirable.

In a preferred embodiment, the first liquid injection point is positioned such that the injection direction is upstream. This ensures a maximum braking effect upon the occurrence of a high torque when operating at high speed, because the direction of the liquid must then be reversed by the flowing gas.

The invention further concerns a method for expanding gas in which this gas is guided by a gas expansion device according to the invention, in which liquid is only injected via the first liquid injection point upon the detection of an exceptional operating condition.

Hereby a first threshold value of a torque being exceeded indicates a first exceptional operating condition.

This torque is the torque of mechanically coupled shafts of the generator and the expansion element. This can be measured in various places, or derived in a known way by a man skilled in the art from other measured values such as speed of rotation and power.

Hereby the occurrence of an emergency situation that requires the stoppage of the gas expansion device indicates a second exceptional operating condition, for example.

Hereby a threshold value of the speed of rotation of the expansion element being exceeded for example, or a second threshold value of a torque being exceeded, or a first threshold value of generated electric power being exceeded indicates an emergency situation.

Alternatively the invention can be defined by means of the following clauses:

1. Gas expansion device comprising a gas expansion element with an inlet port connected to an inlet pipe for pressurised gas, whereby the gas expansion device comprises a liquid injection point that is located before the inlet port.

2. Gas expansion device according to clause 1, in which the gas expansion device further comprises a main liquid injection point that is configured to inject liquid in the gas expansion element at a location after the inlet port.

3. Gas expansion device according to clauses 1 and 2, in which the liquid injection point and the main liquid injection point are both connected via a liquid pipe to two connecting ports of a three-way valve, whereby the third connecting port of the three-way valve is connected to a liquid outlet of a liquid separator connected to the outlet of the gas expansion element.

4. Gas expansion device according to clauses 1 and 2, in which injection control means are provided for controlling the flow of the liquid that is injected via the liquid injection point and the flow of the liquid injected via the main liquid injection point.

5. Gas expansion device according to clauses 3 and 4 in which the control means comprise the three-way valve.

6. Gas expansion device according to clause 3, in which the three-way valve is connected to a controller.

7. Gas expansion device according to clause 6, in which the controller is further connected to a generator that is connected to the gas expansion element, such that the expansion element can drive the generator.

8. Method for operating a gas expansion device according to clause 1, in which the liquid injection is switched off during normal operation via the liquid injection point.

9. Method for operating a gas expansion device according to clause 1, in which, when operating at high speed, the liquid injection via the liquid injection point is activated when the torque or the inlet pressure exceeds a first preset threshold value.

10. Method for operating a gas expansion device according to clause 1, in which, when operating at low speed, the liquid injection via the liquid injection point is activated when the torque or the inlet pressure exceeds a second preset threshold value.

11. Method for operating a gas expansion device according to clause 1, in which during normal operation the liquid injection via the liquid injection point is activated when it goes below a power or torque limit; or when a speed limit is exceeded. The present invention relates to a method for registering the movements of the limbs of an articulated body.

BRIEF DESCRIPTION OF THE DRAWINGS

With the intention of better showing the characteristics of the invention, a preferred embodiment of a gas expansion device according to the invention and an accompanying method are described hereinafter by way of an example without any limiting nature, with reference to the accompanying drawings, wherein.

DETAILED DESCRIPTION OF THE INVENTION

In this example the gas expansion device 1 is a double screw natural gas expansion device with oil injection to the expansion.

However, the invention can be similarly applied to other types of volumetric expansion machines and other fluids than oil and natural gas.

Figure 1:
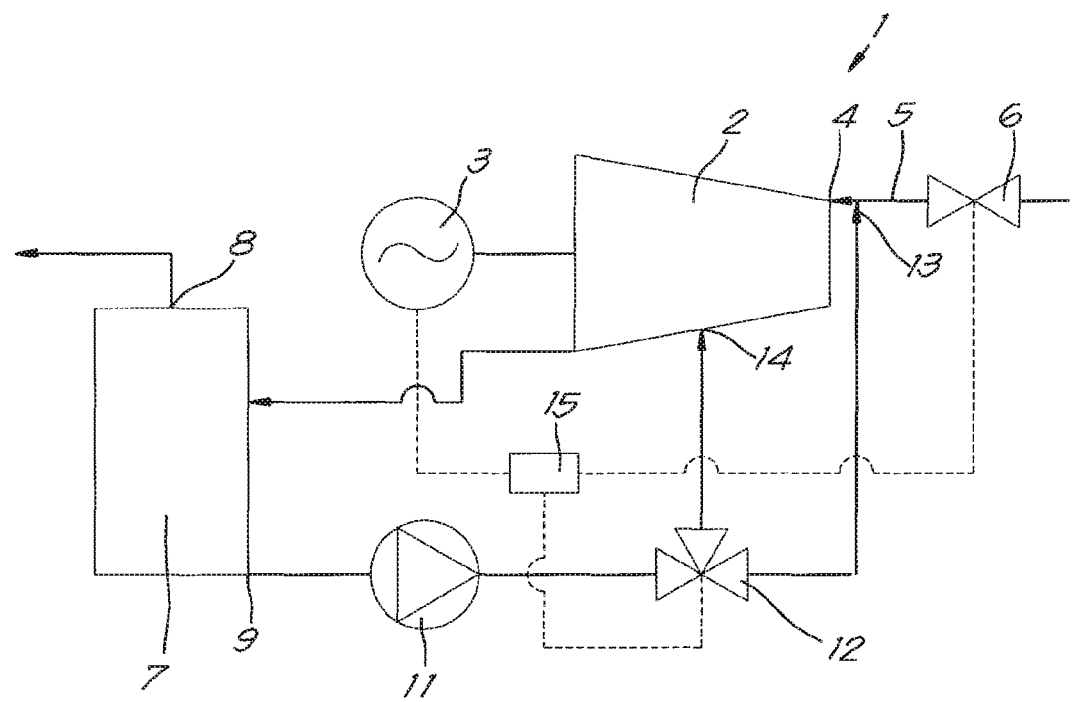
FIG. 1 schematically shows a gas expansion device according to the invention.

The gas expansion device 1, as shown in FIG. 1, comprises a double screw expansion element 2 and an electricity generator 3 that are mechanically coupled together.

The expansion element 2 comprises an inlet port 4 for natural gas that is connected to an inlet pipe 5 for natural gas. A shut-off valve 6 is provided in the inlet pipe 5.

An oil separator 7 for separating oil and gas is provided downstream from the expansion element 2. This has an outlet 8 for expanded gas and an outlet 9 for oil.

The outlet 9 for oil is connected via an oil pump 11 to a first connecting port of a three-way valve 12.

The two other connecting ports of the three-way valve 12 are connected to liquid injection points.

More specifically this concerns a first liquid injection point 13 that is affixed just upstream from the inlet port 4 in the expansion element 2 or in the inlet pipe 5, and a second liquid injection point 14 that is affixed downstream from the inlet port 4.

The first liquid injection point 13 hereby has an injection direction that is opposite to the flow direction of the gas.

The gas expansion device 1 is further provided with an electronic control unit 15 that is connected in a data-transferring way to the shut-off valve 6, the three-way valve 12 and the generator 3.

The operation of the gas expansion device 1 is simple and as follows.

In the event of normal operation, i.e. when a higher torque than desired is not detected, the three-way valve 12 is set such that all oil is driven to the second liquid injection point 14. The operation is then analogous to a traditional gas expansion device.

Figure 2:
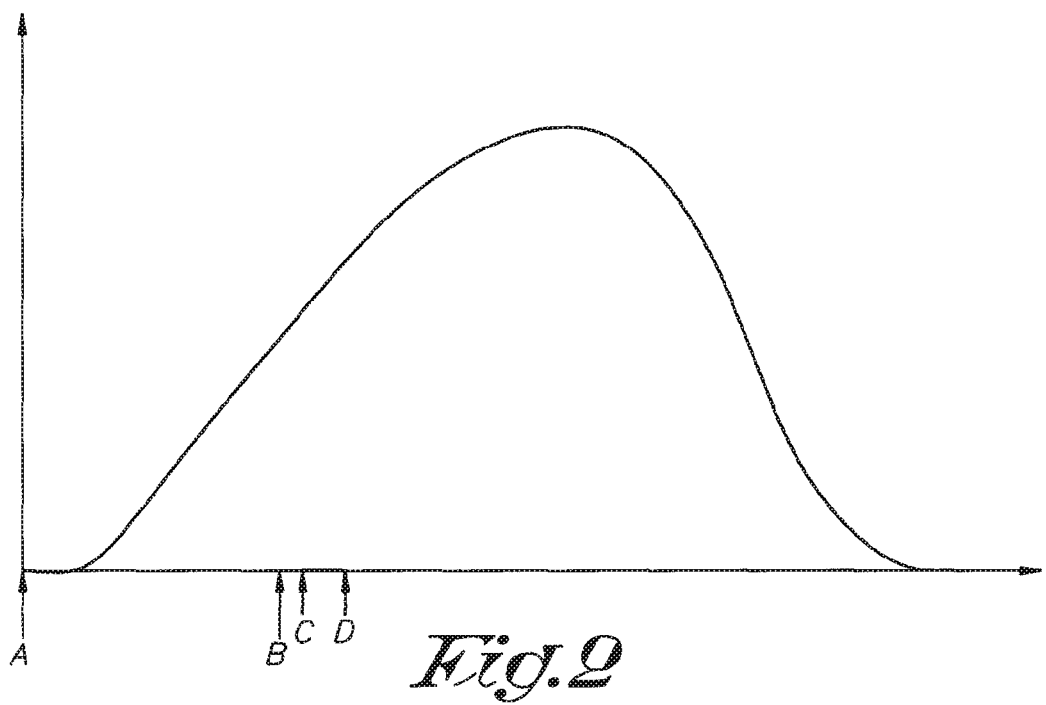
FIG. 2 illustrates the operating principle of the gas expansion device.

This is schematically shown in FIG. 2. The horizontal axis indicates the progress of the rotation of a rotor of the expansion element 2. The vertical axis indicates the volume of an expansion chamber.

Hereby the inlet port 4 is open to the expansion chamber between the points indicated by A and B. Just after the inlet port 4 is closed, oil is injected via the second liquid injection point 14, schematically indicated by the interval from point C to point D.

This is done in this way because, for a cost efficient application of a screw expansion device, the peripheral speed of the rotors must be as high as possible. Hence the oil injection to the inlet of the machine must be minimised to limit the friction losses that reduce an optimum filling of the expansion chamber. Hence, the oil injection is generally controlled such that the oil gets in the expansion chamber after the inlet port is closed, when the oil has no further effect on the filling process of the chamber with gas.

In order to obtain a good effect of the injected oil, it is often injected at high pressure, immediately after the inlet port is closed. The oil pressure is generally higher than the gas pressure at the inlet of the piping, despite the fact that the chamber pressure is reduced immediately after the inlet port closes.

In a first exceptional operating condition, i.e. if a higher than desired torque is measured or calculated in the generator 3 by the control unit 15, the three-way valve 12 is set such that all oil flows to the first liquid injection point 13.

This has two effects. The first effect is that upon injection, the oil experiences a narrowing and change of direction due to the gas flowing past so that the effective inlet pressure of the gas is reduced. The second effect is that the oil flows in the expansion chamber of the expansion element, so that there is less room for the gas. With a high speed of rotation in the first effect will significantly gain the upper hand and at a low speed of rotation the second effect will significantly gain the upper hand.

In both cases the torque is reduced so that an overload of the gas expansion device 1 is prevented.

In a second exceptional operating condition, upon detection of an emergency situation, the three-way valve 12 is also set such that all oil flows to the first liquid injection point 13, with the above-mentioned effects, and additionally the shut-off valve 6 is closed by the control unit 15, so that the gas expansion device 1 quickly comes to a stop in a way that does not cause any damage to the gas expansion device 1.

In the above, downstream and upstream refer to the flow direction of the gas.

The present invention is by no means limited to the embodiments described as an example and shown in the drawings, but a gas expansion device and method according to the invention can be realised in all kinds of forms and dimensions without departing from the scope of the invention.

The invention claimed is:

1. A gas expansion device for expanding a gas or a gas-liquid mixture, whereby the gas expansion device comprises a gas expansion element with an inlet port for the gas to be expanded and an inlet pipe for the gas to be expanded, whereby the inlet pipe is connected to the inlet port, whereby the gas expansion device comprises
    a first liquid injection point for the injection of liquid, wherein the first liquid injection point is in the inlet pipe,
    and the expansion device is provided with a liquid separator for separating liquid from gas that is expanded in the gas expansion element, whereby the first liquid injection point is connected to a liquid outlet of the liquid separator,
    wherein the gas expansion device is provided with a supply pipe for the said liquid, whereby the first liquid injection point and a second liquid injection point are both connected to the supply pipe and wherein said means comprises a three-way valve with three connecting ports, whereby a first of the connecting ports is connected to the supply pipe and other connecting ports are each connected to one of the said liquid injection points.

2. The gas expansion device according to claim 1, wherein the liquid is oil.

3. The gas expansion device according to claim 2, wherein the gas expansion element is a double screw gas expansion element.

4. The gas expansion device according to claim 2, wherein the gas expansion device is provided with means for starting up and switching off a flow of the said liquid to the first liquid injection point.

5. The gas expansion device according to claim 1, wherein the gas expansion element is a double screw gas expansion element.

6. The gas expansion device according to claim 5, wherein the gas expansion device is provided with means for starting up and switching off a flow of the said liquid to the first liquid injection point.

7. The gas expansion device according to claim 1, wherein the gas expansion device is provided with means for starting up and switching off a flow of the said liquid to the first liquid injection point.

8. The gas expansion device according to claim 7, wherein the gas expansion device comprises a control unit to control the said means.

9. The gas expansion device according to claim 8, wherein the gas expansion element is coupled to a generator, such that the expansion element can drive the generator, whereby the control unit is connected in a data-transferring way to the generator.

10. The gas expansion device according to claim 1, wherein the second liquid injection point is configured to inject the said-liquid into the gas expansion element at a position downstream from the inlet port.

11. A method for expanding a gas in which this gas is guided by a gas expansion device according to claim 1, in which liquid is only injected via the first liquid injection point upon the detection of an exceptional operating condition, wherein said exceptional operating condition comprises a first threshold value of a torque being exceeded.

12. A method for expanding a gas in which this gas is guided by a gas expansion device according to claim 1, in which liquid is only injected via the first liquid injection point upon the detection of an exceptional operating condition, wherein said exceptional operating condition comprises a threshold value of a speed of rotation of the expansion element being exceeded.

13. A method for expanding a gas in which this gas is guided by a gas expansion device according to claim 1, in which liquid is only injected via the first liquid injection point upon the detection of an exceptional operating condition, wherein said exceptional operating condition comprises a threshold value of a generated electric power being exceeded.

* * * * *